(12) United States Patent
Herve et al.

(10) Patent No.: US 11,524,665 B2
(45) Date of Patent: Dec. 13, 2022

(54) METHOD FOR INITIALIZING AN ELECTRONICALLY SLIP-CONTROLLABLE POWER BRAKING SYSTEM AFTER A STARTUP AND ELECTRONICALLY SLIP-CONTROLLABLE POWER BRAKING SYSTEM

(71) Applicant: Robert Bosch GmbH, Stuttgart (DE)

(72) Inventors: Benoit Herve, Stuttgart (DE); Christian Meister, Sachsenheim (DE); Christian Michael Praetorius, Obersulm (DE); Daniel Frank, Kleinsachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 16/534,275

(22) Filed: Aug. 7, 2019

(65) Prior Publication Data

US 2020/0055497 A1 Feb. 20, 2020

(30) Foreign Application Priority Data

Aug. 17, 2018 (DE) .......................... 102018213866.4

(51) Int. Cl.
*B60T 8/176* (2006.01)
*B60T 8/32* (2006.01)

(52) U.S. Cl.
CPC .............. *B60T 8/176* (2013.01); *B60T 8/321* (2013.01); *B60T 2250/03* (2013.01); *B60T 2270/10* (2013.01)

(58) Field of Classification Search
CPC ...... B60T 8/176; B60T 8/321; B60T 2250/03; B60T 2270/10; B60T 8/445; B60T 8/4827
See application file for complete search history.

(56) References Cited

U.S. PATENT DOCUMENTS

| 4,753,491 A | * | 6/1988 | Wupper | ................. B60T 8/4233 303/22.1 |
| 4,826,255 A | * | 5/1989 | Volz | ...................... B60T 8/4031 188/345 |

* cited by examiner

*Primary Examiner* — Faris S Almatrahi
*Assistant Examiner* — Andrew J Cromer
(74) *Attorney, Agent, or Firm* — Norton Rose Fulbright US LLP; Gerard Messina

(57) ABSTRACT

A method for initializing an electronically slip-controllable power braking system after a startup and an electronically slip-controllable power braking system. Power braking systems are equipped with a pressure generator for conveying pressure medium in a pressure medium circuit. The pressure generator includes a plunger unit made up of a plunger cylinder, a plunger piston, and a plunger work chamber enclosed by plunger cylinder and plunger piston. A characteristic, using which an actuation of the plunger piston is carried out by the motor during the initialization of the power braking system, is selected by the electronic control unit as a function of a piece of information present about the position of plunger piston at the start of the initialization and implemented by corresponding electronic activation of the motor.

6 Claims, 2 Drawing Sheets

(RELATED ART)

(RELATED ART) Fig. 1

METHOD FOR INITIALIZING AN ELECTRONICALLY SLIP-CONTROLLABLE POWER BRAKING SYSTEM AFTER A STARTUP AND ELECTRONICALLY SLIP-CONTROLLABLE POWER BRAKING SYSTEM

CROSS REFERENCE

The present application claims the benefit under 35 U.S.C. § 119 of German Patent Application No. DE 102018213866.4 filed on Aug. 17, 2018, which is expressly incorporated herein by reference in its entirety.

FIELD

The present invention relates to a method for initializing an electronically slip-controllable power braking system after a startup, and an electronically slip-controllable power braking system.

BACKGROUND INFORMATION

Electronically slip-controllable power braking systems for motor vehicles are in the related art. A hydraulic circuit diagram of a power braking system 10 on which the present invention is based is shown by way of example in FIG. 1. This power braking system 10 includes a plunger unit 32 as a pressure generator, including a plunger cylinder 40, in which a plunger piston 38 is accommodated in a movable or displaceable manner. Plunger cylinder 40 and plunger piston 38 delimit a plunger work chamber 35 with one another, which increases or decreases its volume as a function of the movement direction of plunger piston 38.

Furthermore, a motor 30 for actuating or driving this plunger piston 38 is provided. This motor 30 is an electric motor, which is activatable by an electronic control unit 28 and whose drive power is settable via the current strength delivered thereto by electronic control unit 28. It includes a driveshaft, whose rotational movement is converted by a downstream transmission 36 into a translational movement of plunger piston 38.

As plunger piston 38 moves forward, the volume of plunger work chamber 35 decreases and pressure medium is displaced out of plunger work chamber 35 while building up a pressure medium pressure in brake circuits A; B, which are each connected to plunger unit 32. The latter are each contacted by way of example with two wheel brakes 12. An electronically activatable pressure buildup valve 42 is connected upstream and a pressure reducing valve 44 is connected downstream of each wheel brake 12. Pressure buildup valves 42 control a pressure medium supply to wheel brakes 12, by interrupting or regulating, i.e., partially or completely opening, this pressure medium connection, to determine the brake pressure prevailing at wheel brake 12 via this. A brake force generated by wheel brake 12 results via the brake pressure, using which finally a vehicle equipped with power braking system 10 is braked.

The brake force is adapted by electronic control unit 28 to the slip conditions, which presently prevail between a wheel of the motor vehicle associated with wheel brake 12 and the roadway. A wheel tending toward locking up is detected by wheel speed sensors 48, which detect the rotational velocity of the wheel and relay it to electronic control unit 28 for evaluation. If necessary, the brake pressure prevailing in wheel brakes 12 of the locking wheels is dissipated by closing associated pressure buildup valve 42 and opening associated pressure reducing valve 44. Pressure medium drains out of affected wheel brake or wheel brakes 12 via a shared return line 46 into pressure medium reservoir 14 of power braking system 10.

The volume of the pressure medium storable in plunger work chamber 35 of pressure generator 32 is limited and is successively consumed with each braking procedure or each brake pressure buildup. From time to time, plunger work chamber 35 therefore has to be refilled with new pressure medium from pressure medium reservoir 14. For optimum, i.e., comprehensive utilization of the pressure medium volume of plunger work chamber 35, at least one of the two provided end stops of plunger piston 38 has to be known to electronic control unit 28. If plunger piston 38 is located at its first end stop, plunger work chamber 35 has a maximum volume, and at the second end stop it has a minimum volume.

The end stops of plunger piston 38 may be detected, for example, with the aid of position sensors. However, this type of position detection represents a high constructive expenditure and accordingly entails high costs. Alternatively, the end stops may be detected by targeted approach of one of the end stops of plunger piston 38 after a startup of power braking system 10 with less construction expenditure. Such an initialization procedure of power braking system 10 after its startup extends over a certain duration, whose length is dependent, inter alia, on the position at which plunger piston 38 was located upon the start of the initialization procedure. Moreover, the initialization procedure may not be carried out arbitrarily rapidly, since otherwise the end stop would be approached excessively rapidly by plunger piston 38 and the sudden dissipation of the kinetic energy present in the drive then occurring could cause an undesirable high material strain of the participating components. Moreover, striking of plunger piston 38 on an end stop triggers noises that are perceived as annoying by vehicle occupants and are therefore undesirable in principle.

An object of the present invention is to provide a method for initializing an electronically slip-controllable power braking system 10 after a startup, which is optimized with respect to initialization duration, noise, and material strain of the participating components.

SUMMARY

Example embodiments of the present invention may have the advantage that an initialization procedure of an electronically slip-controllable power braking system may be carried out after a startup within the shortest possible timeframe, without an interfering noise development or increased material strain of the participating components resulting.

According to example embodiments of the present invention, for this purpose the characteristic using which an actuation of the plunger piston is carried out, i.e., specifically the actuating speed at which the plunger piston is moved by the motor, is carried out as a function of a piece of information provided in the electronic control unit about the position of the plunger piston at the beginning of the initialization procedure.

Advantages or advantageous refinements of the present invention are described herein.

BRIEF DESCRIPTION OF THE DRAWINGS

An example method underlying the present invention is illustrated in the figures and is explained in detail below.

DETAILED DESCRIPTION OF EXAMPLE EMBODIMENTS

Figure 1:
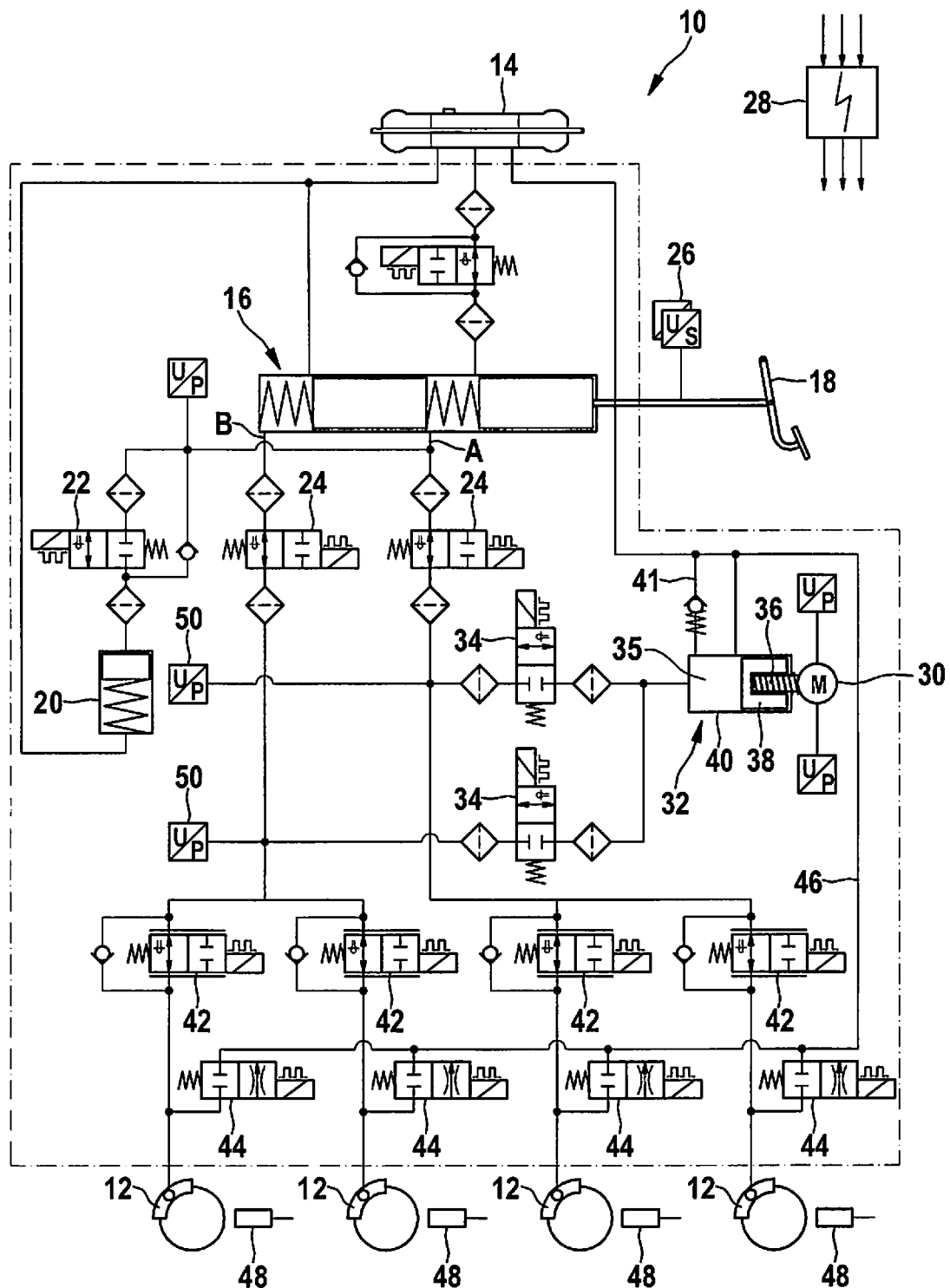
FIG. 1 shows a hydraulic circuit diagram of an electronically slip-controllable power braking system underlying the present invention. This hydraulic circuit diagram has already been explained in the introduction to the description.
Figure 2:
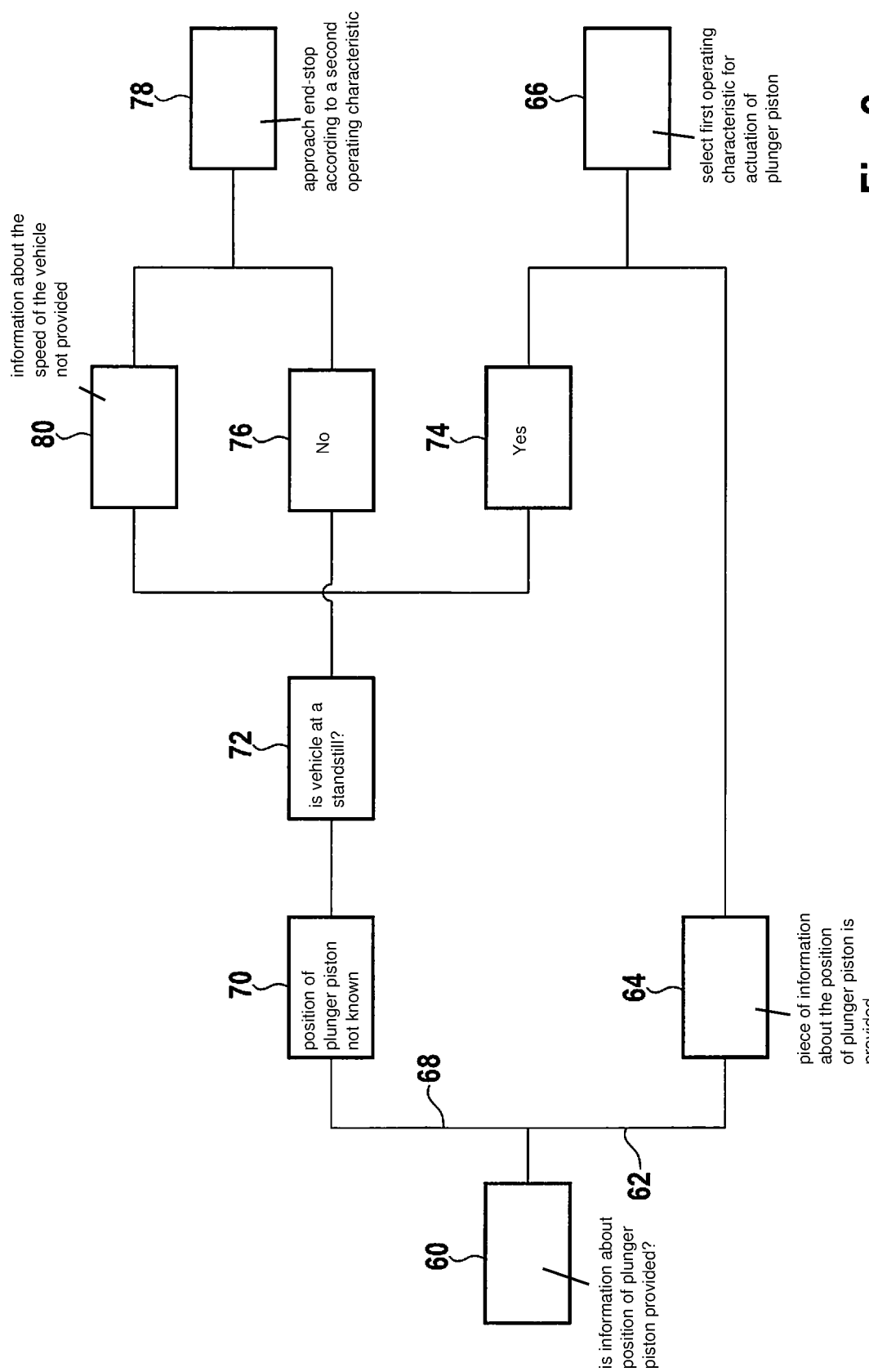
FIG. 2 shows an example method according to the present invention on the basis of a flow chart.

The method sequence shown in FIG. 2 is stored in the form of a data processing program together with other programs in a digital storage medium of electronic control unit 28 of an electronically slip-controllable power braking system 10 (FIG. 1). One object of this data processing system is, inter alia, to monitor the operation of electronic control unit 28 before a final shutdown of electronic control unit 28, to move plunger piston 38 into a defined stopping position by activating motor 30 and/or to carry out an initialization procedure of power braking system 10 upon a further startup of power braking system 10. During such an initialization procedure, plunger piston 38 is moved according to a characteristic selectable by electronic control unit 28 toward one of its end stops to be able to comprehensively use the available volume of plunger work chamber 35 for subsequent braking procedures.

The example method according to the present invention is divided for this purpose by way of example into two method branches 62 and 68 separate from one another, which each lead to one of, by way of example, a total of two characteristics 66; 78, using which the actuation of plunger piston 38 is carried out by electronic control unit 28. Which of the two method branches 62 or 68 is taken for the selection of the suitable characteristic is dependent on whether a piece of information about the position of plunger piston 38 before the preceding shutdown of this electronic control unit 28 is provided or not in electronic control unit 28. This query takes place in step 60 of the proposed method.

Such a piece of position information is typically provided (position 64), since in the case of a regular shutdown of electronic control unit 28, for example, after the vehicle engine is turned off, plunger piston of plunger unit 32 has been moved by motor 30 into a defined stopping position, before electronic control unit 28 has been finally shut down. In this case, method branch 62 finally leading to characteristic 66 is accordingly selected.

In the definition of the stopping position of plunger piston 38, it is to be considered that this stopping position does not coincide with an end stop of the plunger piston movement, but rather the stopping position is located between the two end stops of the plunger piston movement and has a lesser distance from one of the two end stops than to the particular other end stop. The advantage results therefrom that plunger piston 38 may be moved in both actuating directions in the case of a later startup of power braking system 10, for example, for test purposes. Furthermore, it may be ensured that after the stopping of plunger piston 38, the pressure in plunger work chamber 35 may be lowered to atmospheric pressure. Otherwise, the pressure effect originating from a remaining residual pressure on plunger piston 38 could have the result that after the shutdown of electronic control unit 28, the plunger piston position inadvertently changes once again.

If plunger piston 38 has reached the predefined stopping position, a corresponding entry is carried out in a nonvolatile memory of the electronic control unit, whereby a piece of information about the position of plunger piston is provided in electronic control unit 28 (reference numeral 64).

Furthermore, it is to be presumed that the distance of the end stop from the stopping position is known to electronic control unit 28.

On the basis of these pieces of information, electronic control unit 28 is accordingly capable of reducing the speed at which plunger piston 38 is moved during an initialization of power braking system 10 in the direction of its closest end stop enough that plunger piston 38 only strikes against this end stop at low speed, accordingly little noise results, the mechanical strain of the participating components is minimized, and nonetheless a predefined duration for carrying out this initialization procedure of power braking system 10 is not exceeded. A first operating characteristic, in the case of which the plunger piston is driven at reduced speed, is illustrated on the basis of symbol 66 in FIG. 2.

However, if operating states of the power braking system should have occurred, as a result of which the position of plunger piston 38 is not known to electronic control unit 28 (reference numeral 70), for example, because electronic control unit 28 has been shut down as a result of an excessively low applied voltage, a so-called undervoltage event, the proposed method runs according to top method branch 68 in FIG. 2.

In a method step 72, it is queried whether the vehicle is at a standstill. If yes (position 74), to promote the component protection and the noise minimization, when carrying out the initialization of power braking system 10, plunger piston 38 is moved according to actuating characteristics 66, i.e., only at reduced speed, toward the end stop able to be reached faster and if necessary a lengthening of the duration of the initialization procedure is willingly accepted. The actuation of plunger piston 38 at reduced speed may possibly also be expanded to operating ranges in which the motor vehicle is already moving at low speed and resulting noises upon the striking of plunger piston 38 on the end stop are greater than driving noises perceptible by the vehicle occupants.

If the vehicle is not at a standstill, in contrast (reference numeral 76), or is outside the above-explained low speed range, the end stop is approached according to second operating characteristic 78. This second operating characteristic 78 is distinguished by a higher actuating speed of plunger piston 38 than first operating characteristic 66. As a result of this higher actuating speed, only a comparatively short duration is required to carry out the initialization procedure of power braking system 10 and therefore its operational readiness is accordingly established rapidly. Conversely, elevated material strain and/or possible noises are to be accepted.

If pieces of information are not provided about the position of the plunger piston or about the speed of the vehicle (position 66), for example, because of interference at the detection sensors, the initialization or the initialization procedure of power braking system 10 is also carried out at relatively high speed or according to second operating characteristic 78 and a material strain and/or a noise development is accepted in favor of rapidly reestablishing the operational readiness of the power braking system.

Accordingly, a characteristic 66; 78 for the actuation of plunger piston 38 is selected by electronic control unit 28 as a function of a provided piece of information about the position of plunger piston 38 at the start of the initialization and implemented by corresponding electronic activation of motor 30. The selection of characteristic 66; 78 is additionally selected in one advantageous refinement of the present invention in consideration of the speed of the vehicle.

Of course, changes or additions to the explained exemplary embodiment which are not described are possible without departing from the basic concept of the present invention.

What is claimed is:

1. A method for initializing an electronically slip-controllable power braking system after a startup, the power braking system being equipped with a pressure generator for conveying pressure medium in a pressure medium circuit, the pressure generator including a plunger unit made of a plunger cylinder, a plunger piston displaceably accommodated in the plunger cylinder, and a plunger work chamber delimited by the plunger cylinder and the plunger piston, whose volume assumes a maximum value when the plunger piston is located at a first end stop and whose volume assumes a minimum value when the plunger piston is located at a second end stop, and a motor activatable by an electronic control unit for actuating the plunger piston, the method comprising:
selecting, by the electronic control unit, a characteristic, using which the plunger piston is actuated, according to an actuating speed corresponding to the characteristic, by the motor during initialization of the power braking system, wherein the characteristic is selected as a function of a provided piece of information about a position of the plunger piston at a beginning of the initialization; and
implementing the selected characteristic by corresponding electronic activation of the motor, wherein an actuating speed of the plunger piston is reduced in relation to cases in which the position of the plunger piston is unknown at the beginning of the initialization, the actuating speed being reduced in a case of a provided piece of information in the electronic control unit about the position of the plunger piston at the beginning of the initialization or in a case of an absent piece of information about the position of the plunger piston at the beginning of the initialization in conjunction with a provided piece of information according to which a vehicle equipped with the power braking system is at a standstill.

2. The method as recited in claim 1, wherein the characteristic is determined by a variation of an actuating speed of the plunger piston.

3. The method as recited in claim 1, wherein during the selection of the characteristic for actuating the plunger piston, it is taken into consideration by the electronic control unit whether a motor vehicle equipped with the power braking system is at a standstill.

4. The method as recited in claim 1, wherein when the piece of information about the position of the plunger piston at the beginning of the initialization of the power braking system is not provided, the characteristic for the actuation of the plunger piston by the electronic control unit is selected as a function of a speed of a motor vehicle equipped with the power braking system.

5. The method as recited in claim 1, wherein the plunger piston is moved by electronic activation of the motor into a definable stopping position when a piece of information about an existing shutdown intention of the power braking system or the electronic control unit has been established by the electronic control unit, the stopping position being located between the first end stop and the second end stop of the plunger piston, wherein a first distance from the piston to the first end stop is less than a second distance from the piston to the second end stop, or the second distance is less than the first distance.

6. An electronically slip-controllable power braking system for a motor vehicle, comprising:
a pressure generator configured to convey pressure medium in a pressure medium circuit, the pressure generator including a plunger unit made up of a plunger cylinder, a plunger piston displaceably accommodated in the plunger cylinder, and a plunger work chamber delimited by the plunger cylinder and the plunger piston, whose volume changes with an actuation of the plunger piston, and
including a motor activatable by an electronic control unit of the power braking system to actuate the plunger piston between two end positions, in a first end position of the plunger piston, the plunger work chamber having a maximum volume and in a second end position of the plunger piston, having a minimum volume;
wherein the electronic control unit is configured to:
select, by the electronic control unit, a characteristic, using which the plunger piston is actuated, according to an actuating speed corresponding to the characteristic, by the motor during initialization of the power braking system, wherein the characteristic is selected as a function of a provided piece of information about a position of the plunger piston at a beginning of the initialization; and
implement the selected characteristic by corresponding electronic activation of the motor, wherein an actuating speed of the plunger piston is reduced in relation to cases in which the position of the plunger piston is unknown at the beginning of the initialization, the actuating speed being reduced in a case of a provided piece of information in the electronic control unit about the position of the plunger piston at the beginning of the initialization or in a case of an absent piece of information about the position of the plunger piston at the beginning of the initialization in conjunction with a provided piece of information according to which a vehicle equipped with the power braking system is at a standstill.

* * * * *